United States Patent
Pouilly et al.

(10) Patent No.: US 6,788,857 B2
(45) Date of Patent: Sep. 7, 2004

(54) OPTICAL FIBER CABLE, A METHOD OF MANUFACTURING THE OPTICAL FIBER CABLE, AND AN INSTALLATION FOR IMPLEMENTING THE METHOD

(75) Inventors: Serge Pouilly, Dusseldorf (FR); Hubert Prunayre, Calais (FR); Alain Lavenne, Calais (FR); Vincent Bourget, Marly le Roi (FR); Alain Avrons, Calais (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/117,098

(22) Filed: Apr. 8, 2002

(65) Prior Publication Data

US 2002/0146222 A1 Oct. 10, 2002

(30) Foreign Application Priority Data

Apr. 9, 2001 (FR) ............................................. 01 04790

(51) Int. Cl.⁷ ................................................ G02B 6/44
(52) U.S. Cl. ....................................................... 385/104
(58) Field of Search ............................... 385/104, 106, 385/109, 111, 112, 113

(56) References Cited

U.S. PATENT DOCUMENTS

| | | | |
|---|---|---|---|
| 4,078,853 A | | 3/1978 | Kempf et al. ............... 385/114 |
| 4,154,049 A | * | 5/1979 | King et al. ....................... 57/9 |
| 4,214,430 A | | 7/1980 | Vogelsberg et al. ............... 57/6 |
| 4,776,910 A | * | 10/1988 | Taylor et al. ................ 156/145 |
| 4,798,443 A | | 1/1989 | Knipe et al. ................. 385/113 |
| 5,125,062 A | * | 6/1992 | Marlier et al. ............... 385/101 |
| 5,332,165 A | | 7/1994 | Sano et al. ........... 254/134.3 R |
| 5,333,230 A | * | 7/1994 | Hata et al. ................... 385/110 |
| 5,390,273 A | * | 2/1995 | Rahman et al. ............. 385/112 |
| 5,408,562 A | * | 4/1995 | Yoshizawa et al. ......... 385/112 |
| 5,531,064 A | * | 7/1996 | Sawano et al. ................ 57/204 |
| 5,745,628 A | * | 4/1998 | Benzel et al. ............... 385/104 |

FOREIGN PATENT DOCUMENTS

| | | |
|---|---|---|
| DE | 38 36 341 A1 | 4/1990 |
| GB | 2 110 414 A | 6/1983 |
| GB | 2 138 965 A | 10/1984 |

* cited by examiner

Primary Examiner—Tulsidas C. Patel
(74) Attorney, Agent, or Firm—Sughrue Mion, PLLC

(57) ABSTRACT

An optical fiber cable (10) type comprises at least one tube (12) having optical fibers (14) housed therein. The optical fibers (14) extend helically in a longitudinal direction inside the tube (12). In the method of the invention, the tube (12) is fed to the die for manufacturing the cable (10) by unreeling the tube (12) from the storage reel (24) while the storage reel (24) is held stationary, thereby conferring longitudinal twist on the tube (12) constraining the optical fibers (14) it contains to follow a helical path of pitch substantially equal to the length of one turn of the tube (12) wound on the storage reel (24).

18 Claims, 3 Drawing Sheets

OPTICAL FIBER CABLE, A METHOD OF MANUFACTURING THE OPTICAL FIBER CABLE, AND AN INSTALLATION FOR IMPLEMENTING THE METHOD

The present invention relates to an optical fiber cable, to a method of manufacturing the optical fiber cable, and to an installation for implementing the method.

Optical fiber cables, referred to below as optical cables, can present various types of structure.

Thus, in one such type of structure commonly referred to under the trade name FLEXTUBE ®, the optical cable comprises opticalfiber-receiving tubes of synthetic material that are assembled together helically or in an SZ lay. The tube assembly is covered in a sheath defined by a wall having filamentary carriers embedded therein. In structures of that type, the relatively fine and flexible opticalfiber-containing tubes surround the optical fibers they contain sufficiently tightly to prevent practically any relative displacement between the optical fibers and the tubes which contain them.

In most cases, in an optical fiber network, optical cables are themselves housed in conduits, generally made of extruded synthetic material. To thread an optical fiber cable in a conduit, various known methods are known, in particular the blow method and the carry method. While such methods are being performed, the cable components are subjected to varying amounts of lengthening, the cable sheath tending to lengthen more than the optical fibers of the cable. Differences in lengthening can damage the optical fibers since the capacity of fibers for stretching is much less than that of the synthetic material sheath.

An object of the invention is to remedy that drawback by proposing an optical cable that is capable of lengthening considerably, particularly while it is being installed in an optical fiber network, but without that damaging the optical fibers.

To this end, the invention provides an optical fiber cable of the type comprising at least one tube in which optical fibers are received, the cable being characterized in that the optical fibers extend longitudinally and helically within the tube.

According to another characteristic of the cable, the tube presents longitudinal twisting.

The invention also provides a method of manufacturing an optical fiber cable as defined above, the method being of the type in which the tube provided with the optical fibers is fed to a die for manufacturing the cable from a storage reel on which it is wound, the method being characterized in that the tube is fed to the die for manufacturing the cable by unreeling the tube from the reel while the reel is held stationary, thereby imparting longitudinal twisting to the tube causing the optical fibers it contains to follow a helical path of pitch substantially equal to the length of one turn of the tube wound on the reel.

The invention also provides an installation for implementing the above-defined method, characterized in that it includes means for holding the reel in a fixed position and means for unreeling the tube carried by the reel.

Various embodiments of the installation have the following characteristics:

the installation comprises means for holding the storage reel stationary and means for unreeling the tube carried by the storage reel;

the tube is wound on the storage reel about an axis referred to as the axis of the storage reel, the means for unreeling the tube comprising guide means mounted to rotate about an axis that coincides substantially with the axis of the storage reel;

the guide means comprise a moving disk mounted to rotate about the axis of the storage reel, at one end of the storage reel, so as to form a rotary cheek for the storage reel, the tube bearing against the peripheral edge of the moving disk;

the installation comprises a stationary disk provided with an axis of symmetry that coincides substantially with the axis of the storage reel, and friction means arranged on the peripheral edge of the stationary disk to co-operate with a portion of the tube extending downstream from the moving disk in the unreeling direction of said tube in order to brake rotation of the moving disk;

the friction means comprise radial fibers or bristles;

the guide means comprise an unreeling disk mounted to rotate about an axis that coincides substantially with the axis of the storage reel and carrying an unreeling arm extending longitudinally substantially parallel to the axis of the storage reel, the arm being regularly offset relative to the axis of said storage reel so that the unreeling arm turns about the storage reel;

a guide cylinder is mounted to rotate on the unreeling arm, the tube bearing against the peripheral surface of the guide cylinder; and the unreeling disk carries means for deflecting the tube from the unreeling arm towards an orifice for passing the tube through the unreeling disk, this through orifice being substantially in alignment with the axis of the storage reel.

The invention will be better understood on reading the following description given purely by way of example and made with reference to the accompanying drawings, in which:

FIG. 1 shows an optical fiber cable of the invention given overall reference 10.

Figure 1:
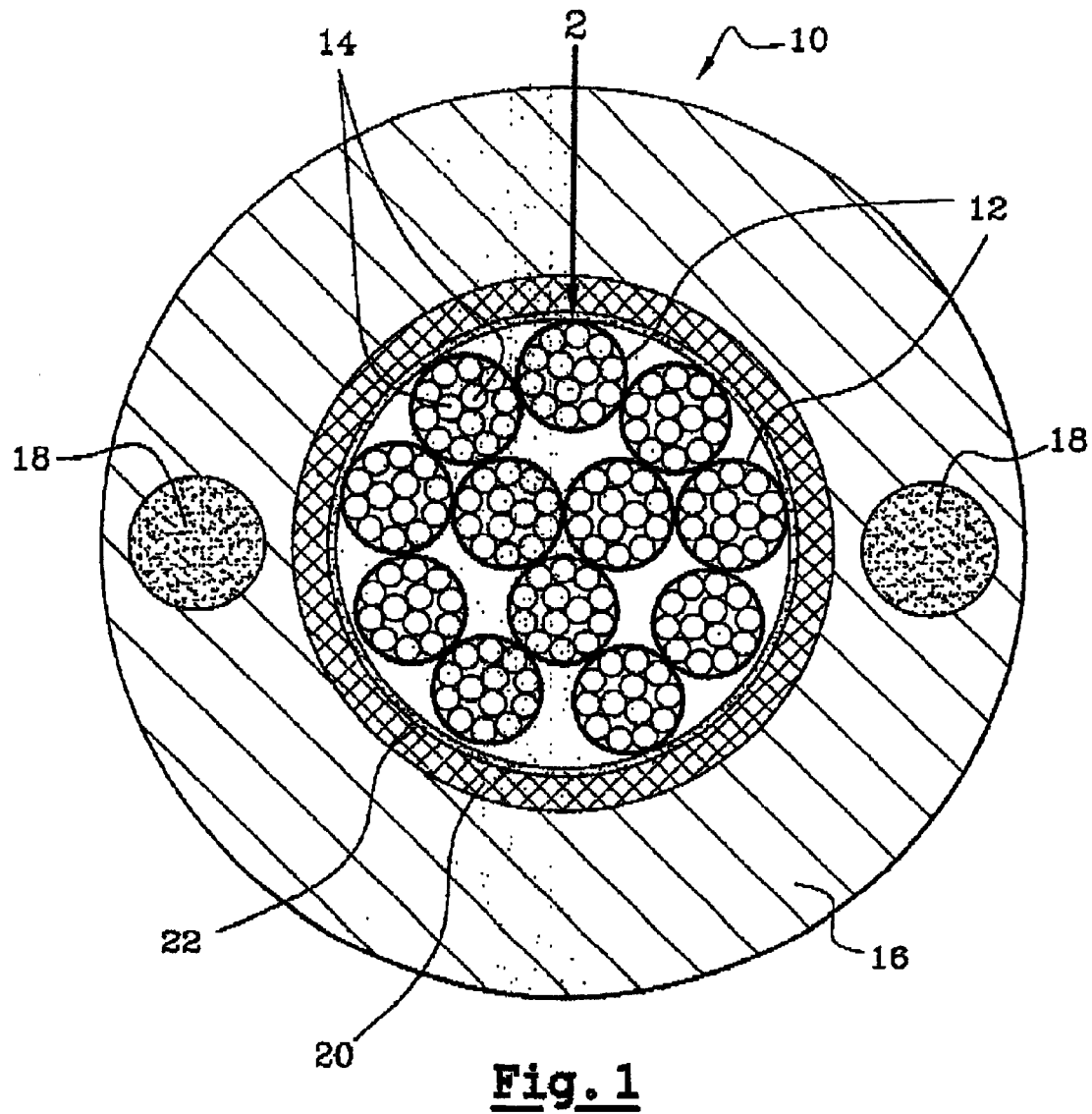
FIG. 1 is a cross-section through an optical fiber cable of the invention.

The optical cable 10 comprises an assembly of flexible tubes 12 each receiving a bundle of conventional optical fibers 14. Each tube 12 contains a dozen optical fibers 14, for example. Nevertheless, the number of optical fibers 14 can be less than or greater than twelve.

In the example shown, the optical cable 10 has twelve tubes 12. Nevertheless, the number of tubes 12 could be different, for example it can lie in the range seven to twelve.

The assembly of tubes 12 is covered in a sheath 16. The tubes 12 preferably extend inside the sheath 16 using a conventional helical or SZ laying technique.

Filamentary elements forming traction reinforcement, and referred to below as carriers 18 are arranged at the periphery of the assembly of tubes 12. The optical cable 10 preferably has two carriers 18 that are diagrammatically opposite, and that are embedded in the wall defining the sheath 16. The structure and the manner of assembling the carriers 18 in the sheath 16 are conventional.

The optical cable 10 preferably includes mechanical reinforcement in the form of roving 20, e.g. of aramid, located radially between the tubes 12 and the sheath 16 in an annular configuration, e.g. being laid helically.

Also preferably, the optical cable 10 has conventional sealing elements.

Such sealing elements can comprise a sealing ribbon 22 located radially between the tubes 12 and the sheath 16, and more particularly in a conventional annular configuration between the tubes 12 and the reinforcing roving 20.

In conventional manner, the sheath 16 is made of a synthetic material which is heated and extruded around the tubes 12, the tubes also being made of synthetic material. It should be observed that the walls of the tubes 12 are relatively fine, as is usually the case for the tubes 12 in an optical cable of the type having carriers arranged at the periphery of the tube assembly.

Figure 2:
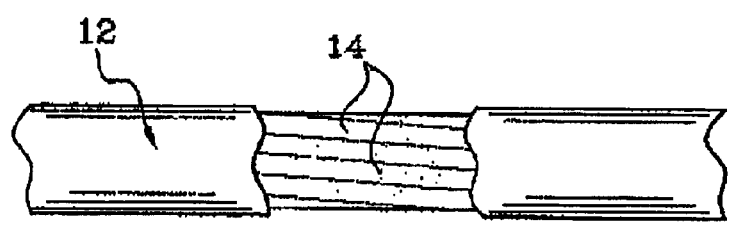
FIG. 2 is partially cut away and is a view seen looking along arrow 2 of FIG. 1 showing a tube in which optical fibers are received.

In the invention, in each of the tubes 12, the optical fibers 14 extend longitudinally in a helical configuration as shown in FIG. 2. Furthermore, each of the tubes 12 presents longitudinal twisting.

When traction is exerted on the cable 10 tending to length the components of the cable, and in particular the sheath 16 of the cable 10, the pitch of the helical arrangement of the optical fibers 14 in each of the tubes 12 tends to increase so as to compensate for the lengthening of the cable 10, but without that applying excessive traction to the optical fibers 14 of a kind that might damage them. Similarly, the longitudinal twisting of the tubes 12 tends to reduce as the cable 10 lengthens, following the increase in the pitch of the helical arrangement of the optical fibers 14, thereby compensating for the lengthening of the cable 10. This thus makes it possible for the cable 10 to lengthen, in particular while it is being laid in an optical fiber conduit, without thereby running the risk of damaging the optical fibers 14 whose capacity for stretching is very small compared with that in particular of the synthetic material sheath 16.

Similarly, this helical arrangement of optical fibers 14 makes it possible to limit the displacement of these fibers 14 due to the cable 10 shrinking, in particular at low temperature.

To manufacture the cable 10, the tubes 12 containing the optical fibers 14 are fabricated initially using a conventional method. Within each tube 12, the optical fibers 14 extend substantially parallel to one another. By way of example, the tube 12 is put into place around the optical fibers 14 by extrusion.

Figure 3:
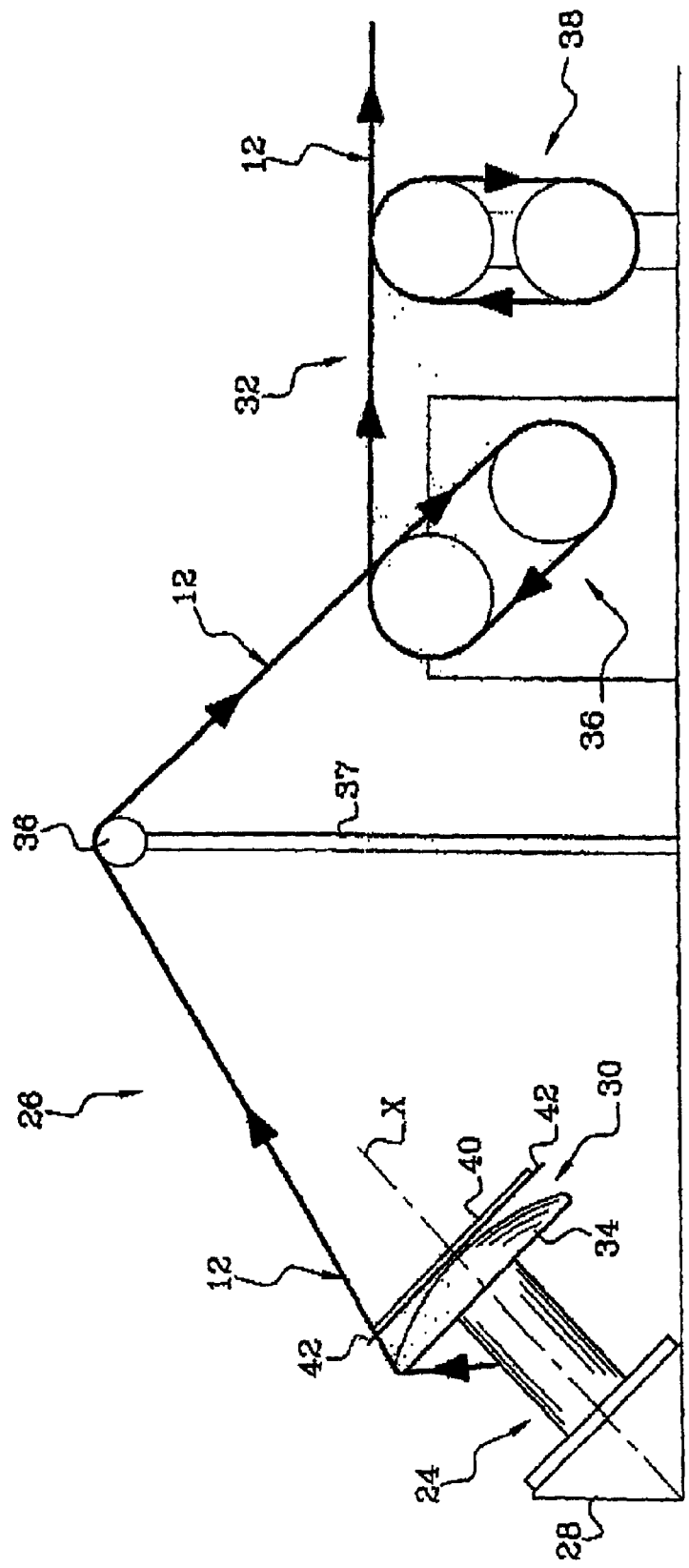
FIG. 3 is a diagrammatic view of a first embodiment of an installation for implementing the method of the invention.
Figure 4:
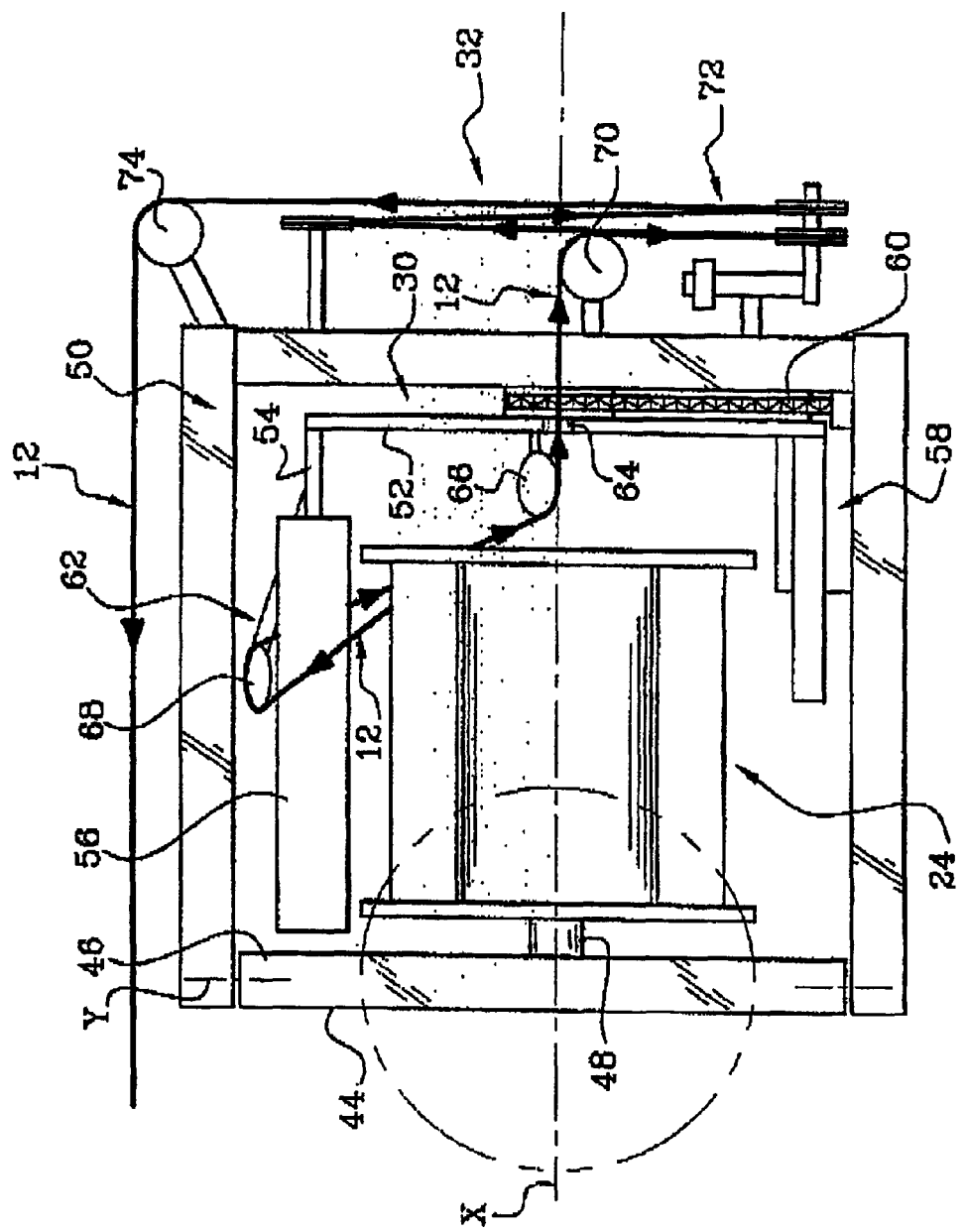
FIG. 4 is a diagrammatic view of a second embodiment of an installation for implementing the method of the invention.

Prior to being assembled together to form the cable 10, the tubes 12 are wound on respective storage reels 24 of the kind shown in FIGS. 3 and 4.

Each tube 12 with its optical fibers 14 is fed to a conventional die for manufacturing the cable 10 from its storage reel 24 on which it is wound. In the invention, the tube 12 is fed to the die for manufacturing the cable 10 by unwinding the tube 12 from the reel 24 while the reel 24 is held stationary. This operation imparts longitudinal twist to the tube 12, causing the fibers 14 it contains to follow a helical path of pitch substantially equal to the length of one turn of the tube 12 wound on the reel 24.

FIG. 3 shows an installation 26 constituting a first embodiment of the invention for feeding a tube 12 containing optical fibers 14 to a conventional die for manufacturing the cable 10.

In FIG. 3, the tube 12 is shown having a portion thereof wound on the storage reel 24 about an axis X referred to below as the reel axis.

The storage reel 24 is held stationary, in particular to prevent it from turning about its axis X, with this being done by conventional means, e.g. by securing it to a stationary support 28.

The installation 26 has means for unwinding the tube 12 carried by the storage reel 24, which means comprise firstly means 30 for guiding the tube 12 and mounted to rotate about an axis that coincides substantially with the axis X of the storage reel 24, and secondly conventional traction-imparting means 32 for tensioning the tube 12.

The guide means 30 comprise a moving disk 34 mounted to rotate about the axis X of the storage reel 24 at one end of said reel 24. Thus, the moving disk 34 forms a rotary cheek on the reel 24 and the tube 12 bears against the periphery thereof, as shown in FIG. 3.

The tube 12 extends from the storage reel 24 to a pulley 36 carried by a pole 37, and it bears against the moving disk 34. The pulley 36 deflects the tube 12 towards the traction-imparting means 32 for putting the tube 12 under tension. These means 32 comprise, for example, a set of drive capstans 36 together with a pulley block forming assembly 38.

To brake rotation of the moving disk 34 and thus limit its speed of rotation, the installation 26 also has a stationary disk 40 whose axis of symmetry coincides substantially with the axis of the storage reel 24. The stationary disk 40 has friction means 42 arranged at the peripheral edge of the stationary disk 40 for co-operating with a portion of the tube 12 that extends downstream from the moving disk 34 in the unreeling direction of the tube 12 (shown by arrows in FIG. 3).

By way of example, the friction means 42 can comprise radial fibers or bristles.

FIG. 4 shows an installation 26 for feeding the tube 12 in a second embodiment of the invention. In FIG. 4, elements that are analogous to those of FIG. 3 are designated by references that are identical.

In this case, the storage reel 24 is prevented from moving by being secured to a bracket 44. The bracket has a vertical upright 46 and a horizontal cross-member 48 carrying the reel 24. The cross-member 48 extends substantially along the axis X of the reel 24.

The upright 46 is mounted to pivot on a frame 50 about an axis Y between a position for loading the reel 24 on the cross-member 48, as shown in dashed lines in FIG. 4, and a position in which the tube 12 is unreeled, as shown in continuous lines in FIG. 4.

The guide means 30 of the installation 26 in the second embodiment of the invention comprise a disk 52 for unreeling the tube 12, which disk is mounted to rotate about an axis coinciding substantially with the axis X of the storage reel 24. The disk 52 carries an arm 54 for unreeling the tube 12, which arm extends longitudinally substantially parallel to the axis X of the storage reel 24. The unreeling arm 54 is offset radially from the axis X of the storage reel 24 so that the unreeling arm 54 turns about the storage reel 24.

A cylinder 56 for guiding the tube 12 is preferably mounted to rotate on the unreeling arm 54. The tube 12 bears against the peripheral surface of this guide cylinder 56.

The unreeling disk 52 is driven by conventional motorized means represented in FIG. 4 by a drive motor 58 and a belt 60 coupling the motor 58 to the unreeling disk 52.

The unreeling disk 52 carries means 62 for deflecting the tube 12 from the unreeling arm 54 and the guide cylinder 56 towards an orifice 64 for passing the tube 12 through the unreeling disk 52. This through orifice 64 is substantially in alignment with the axis X of the storage reel 24.

By way of example, the guide means 62 comprise two deflector pulleys 66 and 68 carried respectively by the unreeling disk 52 and by the guide arm 54.

The tube 12 extends through the orifice 64 from the deflector pulley 66 carried by the unreeling disk 52 to a first pulley 70 carried by the frame 50. This pulley 70 deflects the tube 12 towards the traction means 32 for putting the tube 12 under tension. By way of example, these means 32 comprise an assembly 72 forming a pulley block located upstream from a second deflector pulley 74 carried by the frame 50, where "upstream" is relative to the unreeling direction of the tube 12 as indicated by arrows in FIG. 4.

The advantages of the invention include that of the method of the invention making it possible to impart twist to the tube 12 that imparts a helical lay to the optical fibers 14 contained in the tube 12. Thus, when traction is exerted on the cable 10 tending to lengthen the components of the cable, and in particular the sheath 16 by stretching it, the helix formed by the optical fibers 14 deforms by lengthening its pitch, so that it lengthens together with the cable sheath, while preserving the optical fibers 14 from any damaging stretching.

Naturally, the invention can be applied to manufacturing optical fiber cables of a variety of types other than those known by the trade name FLEXTUBE ®.

What is claimed is:

1. An optical fiber cable (10), comprising:
   a tube (12) having optical fibers (14) housed therein, the tube being disposed in a helical or SZ type lay, wherein the tube (12) is longitudinally twisted so as to impose a longitudinally-extending helical path inside the tube (12) for the optical fibers (14) housed therein.

2. An optical fiber cable (10) according to claim 1, wherein said optical fibers present a helical path of pitch substantially equal to the length of one turn of said tube when wound on a storage reel.

3. A method of manufacturing an optical fiber cable (10), the optical fiber cable comprising a tube (12) having optical fibers (14) housed therein, the tube being disposed in a helical or SZ type lay, wherein the tube (12) is longitudinally twisted so as to define a longitudinally-extending helical path inside the tube (12) for the optical fibers (14) housed therein; the method comprising the steps of:
   feeding the tube (12) provided with the opticals fibers (14) to a die for manufacturing the cable (10) from a storage reel (24) on which it is wound, the tube (12) is fed to the die by unreeling the tube (12) from the storage reel (24) while the storage reel (24) is held stationary, thereby imparting longitudinal twisting to the tube (12) causing the optical fibers (14) housed within the tube to follow a helical path of pitch substantially equal to the length of one turn of the tube (12) wound on the storage reel (24).

4. An installation (26) for implementing the method according to claim 3, the installation comprising means (28; 44) for holding the storage reel (24) stationary and means (30;32) for unreeling the tube (12) carried by the storage reel (24).

5. An installation (26) according to claim 4, wherein the tube (12) is wound on the storage reel (24) about an axis (X) referred to as the axis of the storage reel (24), the means for unreeling the tube (12) comprising guide means (30) mounted to rotate about an axis that coincides substantially with the axis (X) of the storage reel (24).

6. An installation (26) according to claim 5, wherein the guide means (30) comprise a moving disk (34) mounted to rotate about the axis (X) of the storage reel (24), at one end of the storage reel (24), so as to form a rotary cheek for the storage reel (24), the tube (12) bearing against the peripheral edge of the moving disk (34).

7. An installation (26) according to claim 6, further comprising a stationary disk (40) provided with an axis of symmetry that coincides substantially with the axis (X) of the storage reel (24), and friction means (42) arranged on the peripheral edge of the stationary disk (40) to co-operate with a portion of the tube (12) extending downstream from the moving disk (34) in the unreeling direction of said tube (12) in order to brake rotation of the moving disk (34).

8. An installation (26) according to claim 7, wherein the friction means (42) comprise radial fibers or bristles.

9. An installation (26) according to claim 5, wherein the guide means (30) comprise an unreeling disk (52) mounted to rotate about an axis that coincides substantially with the axis (X) of the storage reel (24) and carrying an unreeling arm (54) extending longitudinally substantially parallel to the axis (X) of 35 the storage reel (24), the arm being regularly offset relative to the axis (X) of said storage reel (24) so that the unreeling arm (54) turns about the storage reel (24).

10. An installation (26) according to claim 9, wherein a guide cylinder (56) is mounted to rotate on the unreeling arm (54), the tube (12) bearing against the peripheral surface of the guide cylinder (56).

11. An installation (26) according to claim 9 or claim 10, wherein the unreeling disk (52) carries means (66, 68) for deflecting the tube (12) from the unreeling arm (54) towards an orifice (64) for passing the tube (12) through the unreeling disk (52), this through orifice (64) being substantially in alignment with the axis (X) of the storage reel (24).

12. The optical fiber of claim 1, wherein the optical fibers are frictionally coupled to an inner wall of the tube.

13. The optical fiber of claim 1, wherein the tube is extruded about the optical fibers.

14. The optical fiber of claim 1, comprising additional tubes having optical fibers housed therein, the additional tubes being disposed in a helical or SZ type lay, wherein the additional tubes are longitudinally twisted so as to define respective longitudinally-extending helical paths inside the additional tubes additional optical fibers housed therein; and wherein, for each additional tube, the respective additional optical fibers are frictionally coupled to an inner wall of the tube.

15. An installation for implementing the method according to claim 3, the installation comprising:
   a storage reel defining an axis X and about which the tube is wound;
   a guide disposed at one end of the storage reel and mounted to rotate above the axis X so that the tube contacts the guide upon being unwound from the storage reel.

16. The method of manufacturing an optical fiber cable according to claim 3, wherein the optical fibers are frictionally coupled to an inner wall of the tube.

17. An optical fiber cable, comprising:
   a tube having optical fibers housed therein, the tube being disposed in a helical or SZ type lay, wherein the tube is longitudinally twisted so as to impose a longitudinally-extending helical path inside the tube for the optical fibers housed therein; and wherein an inner surface of the tube directly contacts at least part of the optical fibers.

18. The optical fiber cable according to claim 17, wherein tube is extruded about the optical fibers.

* * * * *